United States Patent
Brümmer et al.

(10) Patent No.: US 12,191,538 B2
(45) Date of Patent: Jan. 7, 2025

(54) COOLER PASSIVATION PROCESS FOR A COOLANT COOLER OF A COOLER DEVICE MOUNTED IN A MOTOR VEHICLE, COOLER DEVICE, AND USE OF A MOTOR VEHICLE TO PASSIVATE A COOLANT COOLER OF A COOLER DEVICE

(71) Applicant: MAHLE INTERNATIONAL GMBH, Stuttgart (DE)

(72) Inventors: Richard Brümmer, Stuttgart (DE); Peter Englert, Bad Friedrichshall (DE); Matthias Pfitzer, Deizisau (DE); Thomas Strauss, Notzingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 0 days.

(21) Appl. No.: 18/291,865

(22) PCT Filed: Jul. 12, 2022

(86) PCT No.: PCT/EP2022/069461
§ 371 (c)(1),
(2) Date: Jan. 24, 2024

(87) PCT Pub. No.: WO2023/006408
PCT Pub. Date: Feb. 2, 2023

(65) Prior Publication Data
US 2024/0266557 A1    Aug. 8, 2024

(30) Foreign Application Priority Data

Jul. 29, 2021   (DE) .......................... 102021208231.9

(51) Int. Cl.
*H01M 8/04*   (2016.01)
*B60L 58/33*  (2019.01)
(Continued)

(52) U.S. Cl.
CPC ......... *H01M 8/04029* (2013.01); *B60L 58/33* (2019.02); *F28F 19/02* (2013.01); *H01M 8/04723* (2013.01); *H01M 2250/20* (2013.01)

(58) Field of Classification Search
CPC ......... H01M 8/04029; H01M 8/04723; H01M 2250/20; B60L 58/33
(Continued)

(56) References Cited

U.S. PATENT DOCUMENTS

| 10,882,392 B2 | 1/2021 | Wakatsuki |
| 2007/0075120 A1 | 4/2007 | Yang et al. |

(Continued)

FOREIGN PATENT DOCUMENTS

| CN | 109585877 | 4/2019 |
| DE | 102017206940 | 10/2018 |

(Continued)

OTHER PUBLICATIONS

English translation of Search Report & Written Opinion issued in PCT/EP2022/069461 (Dec. 15, 2022).

*Primary Examiner* — James M Erwin
(74) *Attorney, Agent, or Firm* — Barnes & Thornburg LLP

(57) ABSTRACT

A cooler passivation process for a coolant cooler of a cooler device mounted in a motor vehicle A cooler device with a coolant cooler is provided, the latter having at least one aluminum cooling channel with a cooler surface provided with flux. The cooler device is provided in a motor vehicle and is then put into operation with at least one fuel cell of the motor vehicle. In order to form a passivation layer on the coolant cooler, according to the invention a previously provided aqueous passivation solution is formed from passivation layer forming material and fuel cell wastewater is applied to the cooler surface, provided with the flux, of the (Continued)

at least one aluminum cooling channel, the passivation solution reacting with the cooler surface, provided with the flux, of the at least one aluminum cooling channel while thermal energy provided by the coolant cooler is supplied, forming a passivation layer.

15 Claims, 1 Drawing Sheet

(51) Int. Cl.
    *F28F 19/02*     (2006.01)
    *H01M 8/04029*     (2016.01)
    *H01M 8/04701*     (2016.01)

(58) Field of Classification Search
    USPC .......................................................... 429/442
    See application file for complete search history.

(56) References Cited

U.S. PATENT DOCUMENTS

| | | |
|---|---|---|
| 2018/0305820 A1 | 10/2018 | Englert et al. |
| 2021/0309862 A1 | 10/2021 | Kataoka et al. |
| 2022/0112606 A1 | 4/2022 | Englert et al. |

FOREIGN PATENT DOCUMENTS

| | | |
|---|---|---|
| DE | 102019112444 | 1/2020 |
| DE | 102019106291 | 9/2020 |
| DE | 102019209249 | 12/2020 |
| DE | 102021106212 | 10/2021 |
| JP | 2002372385 | 12/2002 |
| JP | 2013099982 | 5/2013 |

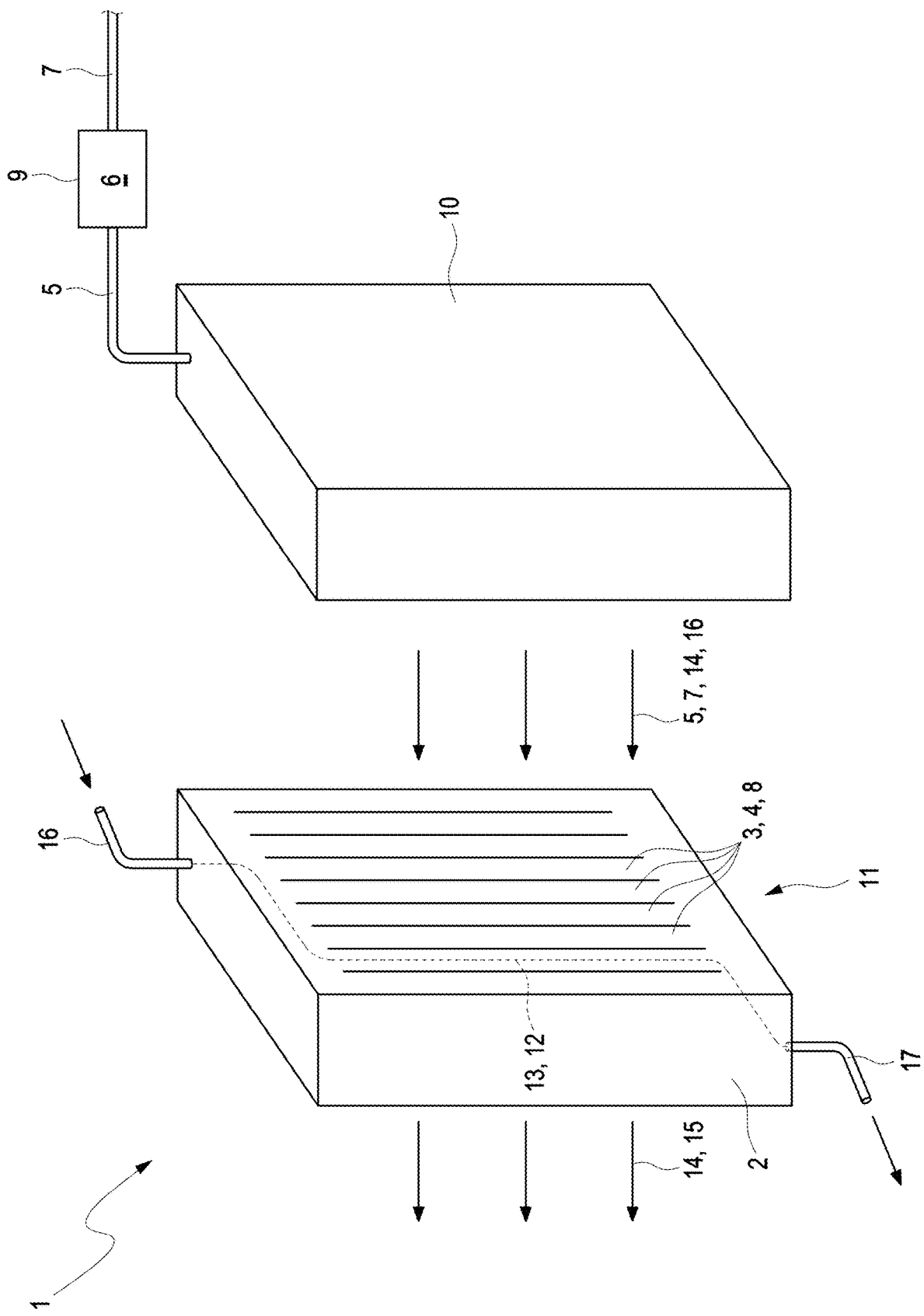

COOLER PASSIVATION PROCESS FOR A COOLANT COOLER OF A COOLER DEVICE MOUNTED IN A MOTOR VEHICLE, COOLER DEVICE, AND USE OF A MOTOR VEHICLE TO PASSIVATE A COOLANT COOLER OF A COOLER DEVICE

CROSS-REFERENCE TO RELATED APPLICATIONS

This application is a national stage application under Section 371 of PCT Application No. PCT/EP2022/069461, filed Jul. 12, 2022, which claims priority from German Patent Application No. DE 10 2021 208 231.9, filed Jul. 29, 2021, the entirety of each are fully incorporated by reference herein.

The invention relates to a cooler passivation method for a coolant cooler of a cooler device mounted in a motor vehicle according to the preamble of claim 1. In addition, the invention relates to such a cooler device and a use of such a motor vehicle for passivating a coolant cooler of a cooler device.

A cooler passivation method for a coolant cooler of a cooler device is described in the document DE 10 2019 209 249 A1, wherein for passivation of an aluminium surface provided with a flux it is provided to apply a passivation solution onto the same, so that through a reaction of the passivation solution with the aluminium surface provided with the flux a passivation layer is created. Disadvantageous in this cooler passivation method is that as part of the production such a coolant cooler or of such a cooler device an additional method step for coating always has to be provided, as a result of which corresponding cooler passivation methods are relatively expensive.

The object of the invention consists in stating an improved or at least another embodiment for a cooler passivation method. In particular, it is attempted to do without the additional coating method step.

In the present invention, this object is solved in particular through the subjects of the independent claims. Advantageous embodiments are subject of the dependent claims and of the description.

The basic idea of the invention consists in stating a cooler passivation method for a coolant cooler of a cooler device, which is carried out when the coolant cooler is already mounted in a motor vehicle.

The cooler passivation method for a coolant cooler of a cooling device already mounted in a motor vehicle according to the invention provides the following steps for this purpose:

1) providing a cooler device with coolant cooler, which comprises at least one aluminium cooling channel with a cooler surface provided with flux;
2) providing the cooler device in a motor vehicle;
3) starting up the cooler device and a fuel cell of the motor vehicle;
4) providing an aqueous passivation solution of provided passivation layer forming material and fuel cell wastewater, which is provided as reaction product as part of the operation of the fuel cell;
5) applying the provided passivation solution to the cooler surface of the at least one aluminium cooling channel provided with the flux, so that the passivation solution reacts with the cooler surface of the at least one aluminium cooling channel provided with the flux under supply of heat energy provided by the coolant cooler to form a passivation layer.

Thus, the formation of a passivation layer can take place during the operation of the motor vehicle, i.e. at least when the cooler device and fuel cell of the same are activated. The passivation layer is quasi-formed "in situ". Thus, an additional coating method step which, as mentioned, usually takes place as part of the production of a corresponding coolant cooler, can be omitted. Because of this, the stated cooler passivation method is relatively cost-effective. Further, no corrosion attack on the cooler surface or on the aluminium cooling channels can practically take place through the provided passivation layer so coolant coolers coated according to the proposed cooler passivation method can convince with relatively long service lives.

Practically it can be provided that the passivation layer forming material according to Step 4) is provided in that it is stored in a replaceable solid cartridge. An aqueous passivation solution according to Step 4) can be provided in that the solid cartridge is flowed through by fuel cell wastewater, wherein the passivation layer formation material stored therein is dissolved in this fuel cell wastewater continuously, i.e. over a certain predetermined period of time and flushed out with the same. Thus, a relatively simple realisation option for storing passivation layer forming material and for providing aqueous passivation solution is stated.

Alternatively, the passivation layer forming material according to Step 4) is provided, in that it is arranged and stored in a container referred to as fuel cell wastewater storage container. Here, it is practically opportune to provide an aqueous passivation solution according to Step 4) in that in the fuel cell wastewater storage container from the fuel cell, fuel cell wastewater provided as part of its operation, is stored, wherein the passivation layer forming material arranged and stored in the fuel cell wastewater storage container is continuously dissolved in this fuel cell wastewater and flushed out with the same. By way of this, a relatively simple realisation option for storing passivation layer forming material and for providing aqueous passivation solution is stated.

Practically, applying the passivation solution according to Step 5) can be realised in that a sprinkling system of the cooler device is utilised. For this purpose, the passivation solution can be sprayed onto the cooler surface of the at least one aluminium cooling channel provided with flux so that the cooler surface is at least partially or completely wetted with passivation solution. Practically, such a sprinkling device can use water and/or passivation solution with a relatively low pressure in particular an overpressure of maximally 5 bar relative to the standard atmosphere or an absolute pressure of maximally 5 bar relative to the standard atmosphere or an absolute pressure of maximally 5 bar. This means in particular that the sprinkling system sprays water or passivation solution with a relatively low pressure, in particular an overpressure of maximally 5 bar relative to the standard atmosphere or an absolute pressure of maximally 5 bar, onto a cooler surface of the coolant cooler, so that the same is at least wetted over a large area and practically completely. The sprinkling system has since been employed in the operation of the fuel cell for cooling power increase of the coolant cooler, wherein a cooling power increase is achieved in that water is sprayed onto the coolant cooler and evaporated endothermically, as a result of which the components of the coolant cooler wetted with water cool down. Through the additional spraying of passivation solution, the sprinkling system can fulfil an additional function which brings with it the advantage that other kinds of injectors for introducing the passivation solution can be omitted. Thus, a corresponding cooler device and/or the cooler passivation method performed with the same is/are relatively careful on resources and cost-effective.

Further it can be provided that by means of the sprinkler system fuel cell wastewater, which is incurred as part of the operation of the fuel cell as reaction product, is sprayed. Here it is practical when a predetermined or predeterminable mass flow or volume flow of passivation solution or passivation layer forming material is directly added or introduced into the same. By way of this, a mixture of fuel cell wastewater and passivation solution and/or passivation layer forming material can be quasi provided, and sprayed onto the cooler surface of the at least one aluminium cooling channel provided with flux, wherein the said cooler surface is preferably wetted at least partially or completely. By adding the passivation solution and/or the passivation layer forming material to the fuel cell wastewater, the chemical potential of the fuel cell wastewater can be reduced so far that a corrosion attack of the coolant cooler or of the cooler surface of the at least one aluminium cooling channel can be practically excluded.

It is practical, furthermore, when the said fuel cell wastewater is sprayed by means of the sprinkling system in a spray jet provided with flux onto the cooler surface of the at least one aluminium cooler channel so that the cooler surface is wetted at least partially or completely. In the process, an aqueous passivation solution according to Step 4) can be preferably provided in that passivation layer forming material is directly introduced into this spray jet of fuel cell wastewater.

Basically it is also conceivable that for applying the passivation solution according to Step 5), instead of a sprinkling system additionally or alternatively a misting system is used. Such a misting system can spray water and/or passivation solution with a relatively low pressure, in particular an overpressure of maximally 5 bar relative to the standard atmosphere or an absolute pressure of maximally 5 bar, onto a cooler surface of the coolant cooler, so that the same is at least over a large area and practically completely wetted.

Practically, a sprinkling system and/or a misting system can mist-up water and/or passivation solution by spraying or rotation.

"Spraying on by means of a sprinkling system" and "spraying on by means of a sprinkling system" in terms of the invention is to practically mean an application of water and/or passivation solution in relatively large fluid drops. In contrast with this, the invention is to mean by "spraying on by means of a misting system" and "spraying on by means of a misting system" practically an application of water and/or passivation solution in relatively small fluid mist droplets. Practically, the fluid drops in terms of their dimensions and/or their fluid volume are larger than the fluid mist drops.

Furthermore, the spraying of fuel cell water and/or of passivation solution by means of the sprinkling system has to take place with a predetermined or predeterminable mass flow or volume flow of fuel cell wastewater and/or with a predetermined or predeterminable mass flow or volume flow of passivation solution. Naturally, the fuel cell wastewater and/or the passivation solution can also be subjected to a predetermined or predeterminable pressure. By way of this, the cooling power of the coolant cooler can be influenced on the one hand while on the other hand the application of the passivation solution can also be influenced so that for example the reaction of the same can be controlled and thus the formation of the passivation solution controlled.

Practically, applying the passivation solution according to Step 5) can also be realised in that the passivation solution, with respect to a cooling air flow of cooling air flowing through the coolant cooler, is introduced into the cooling air flow upstream of the coolant cooler, so that the passivation solution with the cooling air flow is transported to the at least one aluminium cooling channel of the coolant cooler and the cooler surface of the same is wetted partially or completely with passivation solution. By way of this, for example the spray effect, in the case that the passivation solution is sprayed onto the coolant cooler with a sprinkling system, can be facilitated.

Furthermore it can be provided that the passivation layer is formed in a single method pass, for the purpose of which the Steps 1) to 5) are carried out merely a single time. In order to achieve a continuous formation of a stable passivation layer, the Steps 1) to 5) can be carried out multiple times or repeated continuously. By way of this, a stable passivation layer is provided, through which practically no corrosion attack on the cooler surface or the aluminium cooler channels can take place. In particular, when the Steps 1) to 5) are carried out multiple times or repeated continuously, a series of re-dissolution and separation reactions can be brought about, which realise a continuous homogenisation of the passivation layer.

Practically, the stored quantity or volume of passivation layer forming material is practically adjusted so that the passivation layer is formed completely only when the stored passivation layer forming material has been used up. In the process, the Steps 1) to 5) can be repeated so often until the stored passivation layer forming material has been completely used up. Thus, the quantity or the volume of stored passivation layer forming material is limited to the required dimension for providing a complete passivation layer, as a result of which the cooler device is relatively light in weight and/or the cooler passivation method carried out with the same is relatively cost-effective.

The invention can include the alternative or additional basic idea of stating a cooler device for a fuel cell. The same can be mounted with such a fuel cell in a motor vehicle and preferentially be equipped for carrying out a cooler passivation method according to the preceding description. It is provided that a corresponding cooler device is equipped at least with a coolant cooler for cooling a coolant for a fuel cell, wherein the coolant cooler comprises a contiguous cooler network of at least one aluminium cooling channel forming a cooler surface. Here, a corresponding aluminium cooling channel can be practically produced from any aluminium alloy. A coolant fluid path for a cooling fluid flow of coolant leads through the at least one aluminium cooling channel so that the at least one aluminium cooling channel is or can be quasi flowed through by a coolant. Furthermore, the cooler device comprises a cooling air fluid path for a cooling air flow of cooling air. The cooling air fluid path or the cooling air flow is led about the at least one aluminium cooling channel so that the same is or can be flowed about by cooling air. Thus, cooling air and coolant are thermally contacted so that heat energy can be exchanged. Practically, the coolant forms a heat source and the cooling air a heat sink. Further it is provided that the cooler device comprises a container in which a passivation layer forming material is arranged and stored. By means of the container, the passivation layer forming material can be or is brought into fuel cell wastewater which is provided as reaction product as part of the operation of the fuel cell, as a result of which the passivation layer forming material is completely dissolved in this fuel cell water and an aqueous passivation solution is provided. Furthermore, the cooler device has a sprinkling system which, with respect to the cooling air flow, is arranged upstream of the coolant cooler, by means of which the fuel cell wastewater and/or passivation solution during the operation of the cooler device can be or is introduced into the cooling air flow upstream of the coolant cooler, wherein fuel cell wastewater and/or passivation solution is transported by means of the cooling air flow to the at least one aluminium cooling channel and the cooler surface of the same wetted at least partially, preferentially between 70% to 95% of the cooler surface, or completely. On the wetted places, the passivation solution can react with the cooler surface of the at least one aluminium cooling channel provided with the flux and react with heat energy provided on the coolant cooler by the coolant, forming a passivation layer. Thus, the formation of a passivation layer can thus take place quasi during the operation of the motor vehicle, i.e. at least when the cooler device and fuel cell of the same are activated, as "in situ". A separate coating step as part of the production of the cooler device is therefore no longer required.

Furthermore, it is practical when the said passivation layer forming material is formed from the following complex-forming and layer-forming chemicals or comprises these chemicals, wherein the following list is not conclusive:
- dicarbonic acids, in particular glutaric acid, tartaric acid, fumaric acid, sebacic acid and/or
- fluoridic complexing agents based on zirconates and lanthanides, and/or
- orthosilicates, metasilicates, organic silicates, and/or
- silanes, and/or
- siloxanes, and/or
- aqueous suspensions of polyurethanes, and/or ethanolamines, and/or
- chitosanes, and/or
- phosphates, and/or
- borates as additives, in particular inhibitors.

In particular the borates, chitosanes or phosphates can prevent the formation of a silicon aluminium dipole (corrosion cell) on a cooler surface of the at least one aluminium cooling channel. The proposed chemicals are environmentally compatible and occur naturally.

In order to achieve a high resistance of the passivation layer, it can be practically provided that the formed passivation layer is insoluble in water and/or that the formed passivation layer is a silicate aluminium oxyhydrate layer.

Further it is possible that the said container of the cooler device is formed by a replaceable solid cartridge or a fuel cell wastewater container. The solid cartridge or the fuel cell wastewater container can be or is flowed through by fuel cell wastewater, wherein the passivation layer forming material arranged and stored in the container is either formed by a slowly dissolving solid or by a solid packing.

The invention can include the alternative or additional further basic idea of stating a use of a motor vehicle for passivation of a coolant cooler of a cooler device of the motor vehicle. A corresponding motor vehicle comprises at least one fuel cell and a cooler device integrated in the motor vehicle according to the preceding description, wherein on the motor vehicle passivation layer forming material is arranged and stored and wherein the cooler device for carrying out the cooler passivation method is equipped according to the preceding description in order to passivate the coolant cooler of the cooler device during the operation of the fuel cell and of the cooler device, i.e. during the operation of the motor vehicle.

In summary it should be noted: the present invention preferentially relates to a cooler passivation method for a coolant cooler of a cooler device mounted in a motor vehicle. As part of the cooler passivation method it is provided that a cooler device with coolant cooler is provided, wherein the latter comprises at least one aluminium cooling channel with a cooler surface provided with flux. The cooler device is provided or mounted in a motor vehicle and subsequently put into operation with at least one fuel cell of the motor vehicle. In order to form a passivation layer on the coolant cooler it is provided that a previously provided aqueous passivation solution of passivation layer forming material and fuel cell wastewater is applied to the cooler surface of the at least one aluminium cooling channel provided with the flux, wherein the passivation solution, when heat energy is provided by the coolant cooler, reacts with the cooler surface of the at least one aluminium cooling channel provided with the flux, while forming a passivation layer.

Further important features and advantages of the invention are obtained from the subclaims, from the drawing and from the associated FIGURE description by way of the drawing.

It is to be understood that the features mentioned above and still to be explained in the following cannot only be used in the respective combination stated but also in other combinations or by themselves without leaving the scope of the present invention.

A preferred exemplary embodiment of the invention is shown in the drawing and explained in more detail in the following description, wherein same reference numbers relate to same or similar or functionally same components.

It Shows, Schematically

FIG. 1 a highly simplified perspective view of a preferred exemplary embodiment of a cooler device according to the invention suitable for carrying out the cooler passivation method according to the invention.

FIG. 1 shows a preferred exemplary embodiment of a cooler device marked in totality with the reference number 1, which primarily serves for cooling a coolant for a fuel cell, which is not illustrated, of a motor vehicle which is likewise not illustrated in FIG. 1. The cooler device 1 according to the invention can be mounted in such a motor vehicle and, there, serve for passivating a coolant cooler 2 of the cooler device 1 during the operation of the fuel cell and of the cooler device 1 of the motor vehicle.

In FIG. 1, the said coolant cooler 2 of the cooler device 1 is initially illustrated, with which, as mentioned, a coolant for the fuel cell that is not illustrated can be cooled. Exemplarily it is provided for this purpose that the coolant cooler 2 comprises a contiguous cooler network 11 of multiple aluminium cooling channels 3 each forming a cooler surface 4. A coolant fluid path 12 for a cooling fluid flow 13 of coolant leads through each of these aluminium cooling channels 3, here merely a single coolant fluid path 12 is indicated in FIG. 1 for the sake of clarity. Because of this, each aluminium cooling channel 3 is or can at least be flowed through by coolant. The coolant itself, coming from the fuel cell, flows into the coolant cooler 2 via an inlet 16 and leaves the same via an outlet 17, the flow directions are indicated by corresponding arrows in FIG. 1. Furthermore, the cooler device 1 comprises a cooling air fluid path 14 for a cooling air flow 15 of cooling air, which is conducted about the aluminium cooling channels 3 so that these are or can at least be flowed about by cooling air. Thus, cooling air and coolant are thermally contacted so that heat energy between these can be exchanged. Practically, the coolant forms a heat source and the cooling air a heat sink.

Since the modern fuel cells generally have a relatively high cooling requirement it is desirable to increase the cooling power of the coolant cooler 2. The cooler device 1 for this purpose has a sprinkling system 10 arranged with respect to the cooling air flow 15, upstream of the coolant cooler 2, which in FIG. 1 is indicated by a box. During the operation of the fuel cell, the sprinkling system 10 is supplied with fuel cell wastewater 7 of the fuel cell which is incurred as part of the operation of the fuel cell as reaction product, and sprays this fuel cell wastewater 7 into the cooling air flow 15. The sprayed-in fuel cell wastewater 7 is then transported downstream with the cooling air flow 15 and meets the coolant cooler 2, where it wets the cooler surfaces 4 of the aluminium cooling channels. The fuel cell wastewater 7 thus applied to the coolant cooler 2 evaporates endothermically, as a result of which the wetted aluminium cooling channels 3 of the coolant cooler 2 cool down and an increase of the cooling power materializes. However, the fuel cell wastewater 7 can result in corrosion manifestations on the cooler surfaces 4 of the aluminium cooling channels 3.

In order to prevent these corrosion manifestations it is provided that on the cooler surfaces 4 of the aluminium cooling channels 3 a passivation layer 8 is formed. Here, this is achieved during the operation of the fuel cell and of the cooling device 1 or during the operation of the motor vehicle, for the purpose of which the cooling device 1 comprises a container which, here, is indicated by a box and formed by a fuel cell wastewater storage container 9. In the interior of the fuel cell wastewater container 9 a passivation layer forming material 6 is arranged and stored, which, here, is depicted by a solid packing. Equally, the fuel cell wastewater storage container 9 could be coated with a passivation layer forming material 6. It is substantial that the fuel cell wastewater storage container 9 stores the fuel cell wastewater 7 provided by the fuel cell like a tank, wherein the passivation layer forming material 6 located therein continuously dissolves in this fuel cell wastewater 7, as a result of which in the fuel cell wastewater storage container 9 an aqueous passivation solution 5 is provided. This passivation solution 5 flows out of the fuel cell wastewater storage container 9 or is flushed out of the same and sprayed into the cooling air flow 15 upstream of the coolant cooler 2 by means of the sprinkling system 10. Thus, the passivation solution 5 is transported to the aluminium cooling channels 3 by means of the cooling air flow 15 and wets the cooler surfaces 4 of the same. On the aluminium cooling channels 3 thus wetted, a chemical reaction can now take place in such a manner that the passivation solution 5 reacts with the cooler surface 4 of the aluminium cooling channels 3 provided with the flux and with heat energy provided by the coolant on the coolant cooler 2 subject to forming the passivation layer 8. Exemplarily, the quantify of passivation layer forming material 6 stored in the fuel cell wastewater storage container 9 is dimensioned so that the passivation layer 8 can be completely formed, wherein when the stored passivation layer forming material 6 is used up, merely fuel cell wastewater 7 is sprayed onto the coolant cooler 2 by means of the sprinkling system 10, as in conventional cooling devices.

The specification is best understood with reference to the following Numbered Paragraphs:

Numbered Paragraph 1. A cooler passivation method for a coolant cooler (2) of a cooler device (1) mounted in a motor vehicle, comprising the following steps:

1) providing a cooler device (1) with coolant cooler (2), which comprises at least one aluminium cooling channel (3) with a cooler surface (4) provided with flux;
2) providing the cooler device (1) in a motor vehicle;
3) starting up the cooler device (1) and a fuel cell of the motor vehicle, in particular starting up the motor vehicle;
4) providing an aqueous passivation solution (5) from passivation layer forming material (6) provided on the cooler device (1) and fuel cell wastewater (7), which, during the operation of the fuel cell, is provided as reaction product of the same;
5) applying the provided passivation solution (5) to the cooler surface (4) of the at least one aluminium cooling channel (3) provided with the flux, so that the passivation solution (5) reacts with the cooler surface (4) of the at least one aluminium cooling channel (3) provided with the flux under the supply of heat energy provided by the coolant cooler (2) to form a passivation layer (8).

Numbered Paragraph 2. The cooler passivation method according to Numbered Paragraph 1,
characterised in that
the passivation layer forming material (6) according to Step 4) is provided on the cooler device (1), in that
it is stored in a replaceable solid cartridge, or
it is stored in a fuel cell wastewater storage container (9).

Numbered Paragraph 3. The cooler passivation method according to Numbered Paragraphs 2,
characterised in that
an aqueous passivation solution (5) according to Step 4) is provided, in that
the solid cartridge is flowed through by fuel cell wastewater (7), wherein the passivation layer forming material (6) stored therein is continuously dissolved in this fuel cell wastewater (7) and provided as passivation solution (5), or
the fuel cell wastewater storage container (9) stores fuel cell wastewater (7) provided by the fuel cell, wherein the passivation layer forming material (6) stored therein is continuously dissolved in this fuel cell wastewater (7) and provided as passivation solution (5).

Numbered Paragraph 4. The cooler passivation method according to any one of the preceding Numbered Paragraphs,
characterised in that
applying the passivation solution (5) according to Step 5) is realised in that the passivation solution (5) is sprayed by means of a sprinkling system (10) of the cooler device (1) onto the cooler surface (4) of the at least one aluminium cooling channel (3) provided with flux in such a manner that the cooler surface (4) is at least partially or completely wetted.

Numbered Paragraph 5. The cooler passivation method according to Numbered Paragraph 4,
characterised in that
by means of the sprinkling system (10), fuel cell wastewater (7) and/or passivation solution (5) is sprayed, and/or
wherein a predetermined or predeterminable mass flow or volume flow of passivation solution (5) is introduced into the fuel cell wastewater (7) and together with the same sprayed onto the cooler surface (4) of the at least one aluminium cooling channel (3) provided with flux so that the cooler surface (4) is at least partially or completely wetted.

Numbered Paragraph 6. The cooler passivation method according to any one of the preceding Numbered Paragraphs,
characterised in that
fuel cell wastewater (7) is sprayed by means of a sprinkling system (10) onto the cooler surface (4) of the at least one aluminium cooling channel (3) provided with flux in a spray jet, so that the cooler surface (4) is at least partially or completely wetted,
wherein an aqueous passivation solution (5) according to Step 4) is provided, in that passivation layer forming material (6) is directly introduced into this spray jet of fuel cell wastewater (7) of the sprinkling system (10).

Numbered Paragraph 7. The cooler passivation method according to any one of the Numbered Paragraphs 4 to 6,
characterised in that
the spraying of fuel cell wastewater (7) and/or of passivation solution (5) by means of the sprinkling system (10) is realised with a predetermined or predeterminable mass flow or volume flow of fuel cell wastewater (7) and/or of passivation solution (5) or with a predetermined or predeterminable pressure.

Numbered Paragraph 8. The cooler passivation method according to any one of the preceding Numbered Paragraphs,
characterised in that
applying the passivation solution (5) according to Step 5) is realised in that the passivation solution (5), with respect to a cooling air flow (15) of cooling air flowing through the coolant cooler (2), is introduced into the cooling air flow (15) upstream of the coolant cooler (2), so that the passivation solution (5) with the cooling air flow (15) is transported to the at least one aluminium cooling channel (3) of the coolant cooler (2) and the cooler surface (4) of the same is at least partially or completely wetted with passivation solution (5).

Numbered Paragraph 9. The cooler passivation method according to any one of the preceding Numbered Paragraphs,
characterised in that
the Steps 1) to 5) are merely carried out a single time in order to form a passivation layer (8), or
the Steps 1) to 5) are carried out multiple times or repeated continuously in order to achieve a continuous formation of the passivation layer (8).

Numbered Paragraph 10. A cooler device (1) for a fuel cell, in particular for a motor vehicle comprising such a cooler device (1) and such a fuel cell, further in particular suitable for carrying out a cooler passivation method according to the preceding Numbered Paragraphs,
having a coolant cooler (2) for cooling a coolant for a fuel cell,
wherein the coolant cooler (2) comprises a cooler network (11) of at least one aluminium cooling channel (3) forming a cooler surface (4),
wherein through the at least one aluminium cooling channel (3) a coolant fluid path (12) for a cooling fluid flow (13) of coolant leads, so that the at least one aluminium cooling channel (3) is or can be flowed through by coolant,
having a cooling air fluid path (14) for a cooling air flow (15) of cooling air, which is conducted about the at least one aluminium cooling channel (3), so that the same is or can be flowed about by cooling air,
having a container storing a passivation layer forming material (6), by means of which the passivation layer forming material (6) can be or is introduced into the fuel cell wastewater (7), which is provided as reaction product as part of the operation of the fuel cell, as a result of which the passivation layer forming material (6) is completely dissolved in this fuel cell wastewater (7) and an aqueous passivation solution (5) provided,
having a sprinkling system (10) arranged, with respect to the cooling air flow (15), upstream of the coolant cooler (2), by means of which during the operation of the cooler device (1), fuel cell wastewater (7) and/or passivation solution (5) can be or is introduced into the cooling air flow (15) upstream of the coolant cooler (2),
wherein fuel cell wastewater (7) and/or passivation solution (5) is transported by means of the cooling air flow (15) to the at least one aluminium cooling channel (3) and the cooler surface (4) of the same is at least partially wetted,
wherein the passivation solution (5) reacts with the cooler surface (4) of the at least one aluminium cooling channel (3) provided with the flux and reacts with heat energy provided by the coolant on the coolant cooler (2) subject to forming a passivation layer (8).

Numbered Paragraph 11. A cooler device (1) according to Numbered Paragraph 10,
characterised in that
the passivation layer forming material (6) is formed from the following complexing and layer-forming chemicals:
dicarbonic acids, in particular glutaric acid, tartaric acid, fumaric acid, sebacic acid and/or
fluoridic complexing agents based on zirconates and lanthanides, and/or
orthosilicates, metasilicates, organic silicates, and/or silanes, and/or
siloxanes, and/or
aqueous suspensions of polyurethanes, and/or ethanolamines, and/or
chitosanes, and/or
phosphates, and/or
borates.

Numbered Paragraph 12. The cooler device (1) according to any one of the Numbered Paragraphs 10 or 11,
characterised in that
the formed passivation layer (8) is insoluble in water.

Numbered Paragraph 13. The cooler device (1) according to any one of the Numbered Paragraphs 10 to 12,
characterised in that
the formed passivation layer (8) is a silicate aluminium oxyhydrate layer.

Numbered Paragraph 14. The cooler device (1) according to any one of the Numbered Paragraphs 10 to 13,
characterised in that
the container is formed by a replaceable solid cartridge or a fuel cell wastewater storage container (9), in which the passivation layer forming material (6) is arranged and stored,
wherein the solid cartridge or the fuel cell wastewater storage container (9) can be or is flowed through by fuel cell wastewater (7),
wherein the passivation layer forming material (6) is formed either by a slowly dissolving solid or by a solid packing.

Numbered Paragraph 15. Use of a motor vehicle for passivation of a coolant cooler (2) of a cooler device (1) of the motor vehicle,
having a fuel cell, having a cooler device (1) according to the product Numbered Paragraphs 10 to 14 integrated in the motor vehicle, having passivation layer forming material (6) stored on the motor vehicle, wherein the cooler device (1) for carrying out the cooler passivation method according to the method of any one of Numbered Paragraphs 1 to 9 is equipped in order to passivate the coolant cooler (2) of the cooler device (1) during the operation of the fuel cell and of the cooler device (1).

The invention claimed is:

1. A cooler passivation method for a coolant cooler of a cooler device mounted in a motor vehicle, comprising:
   1) providing the cooler device with the coolant cooler, which comprises at least one aluminium cooling channel with a cooler surface provided with flux;
   2) providing the cooler device in the motor vehicle;
   3) starting up the cooler device and a fuel cell of the motor vehicle, and starting up the motor vehicle;
   4) providing an aqueous passivation solution from a passivation layer forming material provided on the cooler device and fuel cell wastewater, which, during the operation of the fuel cell, is provided as reaction product of the same;
   5) applying the aqueous passivation solution to the cooler surface of the at least one aluminium cooling channel provided with the flux, so that the aqueous passivation solution reacts with the cooler surface of the at least one aluminium cooling channel provided with the flux under the supply of heat energy provided by the coolant cooler to form a passivation layer.

2. The cooler passivation method according to claim 1, wherein the passivation layer forming material according to Step 4) is provided on the cooler device, in that
   the passivation layer forming material is stored in a replaceable solid cartridge, or
   the passivation layer forming material is stored in a fuel cell wastewater storage container.

3. The cooler passivation method according to claim 2, wherein the aqueous passivation solution according to Step 4) is provided, in that
   the solid cartridge is flowed through by the fuel cell wastewater, wherein the passivation layer forming material stored therein is continuously dissolved in the fuel cell wastewater and provided as the aqueous passivation solution, or
   the fuel cell wastewater storage container stores the fuel cell wastewater provided by the fuel cell, wherein the passivation layer forming material stored therein is continuously dissolved in this fuel cell wastewater and provided as the aqueous passivation solution.

4. The cooler passivation method according to claim 1, wherein applying the aqueous passivation solution according to Step 5) is realised in that the aqueous passivation solution is sprayed by means of a sprinkling system of the cooler device onto the cooler surface of the at least one aluminium cooling channel provided with flux in such a manner that the cooler surface is at least partially or completely wetted.

5. The cooler passivation method according to claim 4, wherein
   by the sprinkling system, the fuel cell wastewater and/or the aqueous passivation solution is sprayed, and/or
   wherein a predetermined or predeterminable mass flow or volume flow of the aqueous passivation solution is introduced into the fuel cell wastewater and together with the same sprayed onto the cooler surface of the at least one aluminium cooling channel provided with flux so that the cooler surface is at least partially or completely wetted.

6. The cooler passivation method according to claim 1, wherein
   the fuel cell wastewater is sprayed by means of a sprinkling system onto the cooler surface of the at least one aluminium cooling channel provided with flux in a spray jet, so that the cooler surface is at least partially or completely wetted,
   wherein the aqueous passivation solution according to Step 4) is provided, in that the passivation layer forming material is directly introduced into this spray jet of the fuel cell wastewater of the sprinkling system.

7. The cooler passivation method according to claim 4, wherein the spraying of the fuel cell wastewater and/or of aqueous passivation solution by means of the sprinkling system is realised with a predetermined or predeterminable mass flow or volume flow of the fuel cell wastewater and/or of the aqueous passivation solution or with a predetermined or predeterminable pressure.

8. The cooler passivation method according to claim 1, wherein applying the aqueous passivation solution according to Step 5) is realised in that the aqueous passivation solution, with respect to a cooling air flow of cooling air flowing through the coolant cooler, is introduced into the cooling air flow upstream of the coolant cooler, so that the aqueous passivation solution with the cooling air flow is transported to the at least one aluminium cooling channel of the coolant cooler and the cooler surface of the same is at least partially or completely wetted with aqueous passivation solution.

9. The cooler passivation method according to claim 1, wherein
   the Steps 1) to 5) are merely carried out a single time in order to form the passivation layer, or
   the Steps 1) to 5) are carried out multiple times or repeated continuously in order to achieve a continuous formation of the passivation layer.

10. A cooler device for a fuel cell, for a motor vehicle suitable for carrying out a cooler passivation method according to claim 1,
    comprising the coolant cooler for cooling a coolant for the fuel cell,
    wherein the coolant cooler comprises a cooler network of at least one aluminium cooling channel forming the cooler surface,
    wherein through the at least one aluminium cooling channel a coolant fluid path for a cooling fluid flow of coolant leads, so that the at least one aluminium cooling channel is or can be flowed through by coolant,
    having a cooling air fluid path for a cooling air flow, which is conducted about the at least one aluminium cooling channel, so that the same is or can be flowed about by the cooling air,
    having a container storing the passivation layer forming material, by means of which the passivation layer forming material can be or is introduced into the fuel cell wastewater, which is provided as reaction product as part of the operation of the fuel cell, as a result of which the passivation layer forming material is completely dissolved in this fuel cell wastewater and an aqueous passivation solution provided,
    having a sprinkling system arranged, with respect to the cooling air flow, upstream of the coolant cooler, by means of which during the operation of the cooler device, the fuel cell wastewater and/or the aqueous passivation solution can be or is introduced into the cooling air flow upstream of the coolant cooler, wherein the fuel cell wastewater and/or the aqueous passivation solution is transported by means of the cooling air flow to the at least one aluminium cooling channel and the cooler surface of the same is at least partially wetted, wherein the aqueous passivation solution reacts with the cooler surface of the at least one aluminium cooling channel provided with the flux and reacts with heat energy provided by the coolant on the coolant cooler subject to forming a passivation layer.

11. The cooler device according to claim 10, wherein the passivation layer forming material is formed from the following complexing and layer-forming chemicals:

glutaric acid, tartaric acid, fumaric acid, sebacic acid and/or fluoridic complexing agents based on zirconates and lanthanides, and/or orthosilicates, metasilicates, organic silicates, and/or silanes, and/or siloxanes, and/or aqueous suspensions of polyurethanes, and/or ethanolamines, and/or chitosanes, and/or phosphates, and/or borates.

12. The cooler device according to claim 10, wherein the passivation layer is insoluble in water.

13. The cooler device according to claim 10, wherein the passivation layer is a silicate aluminium oxyhydrate layer.

14. The cooler device according to claim 10, wherein the container is formed by a replaceable solid cartridge or a fuel cell wastewater storage container, in which the passivation layer forming material is arranged and stored, wherein the solid cartridge or the fuel cell wastewater storage container can be or is flowed through by the fuel cell wastewater, wherein the passivation layer forming material is formed either by a slowly dissolving solid or by a solid packing.

15. A method for using a motor vehicle for passivation of a coolant cooler of a cooler device of the motor vehicle, comprising the cooler device according to claim 10 integrated in the motor vehicle, having the passivation layer forming material stored on the motor vehicle, wherein the cooler device for carrying out the cooler passivation method is equipped in order to passivate the coolant cooler of the cooler device during the operation of the fuel cell and of the cooler device.

* * * * *